Nov. 3, 1931.  R. A. MOURON ET AL  1,830,709
VEGETABLE SPRAYING ATOMIZER
Filed Aug. 1, 1930
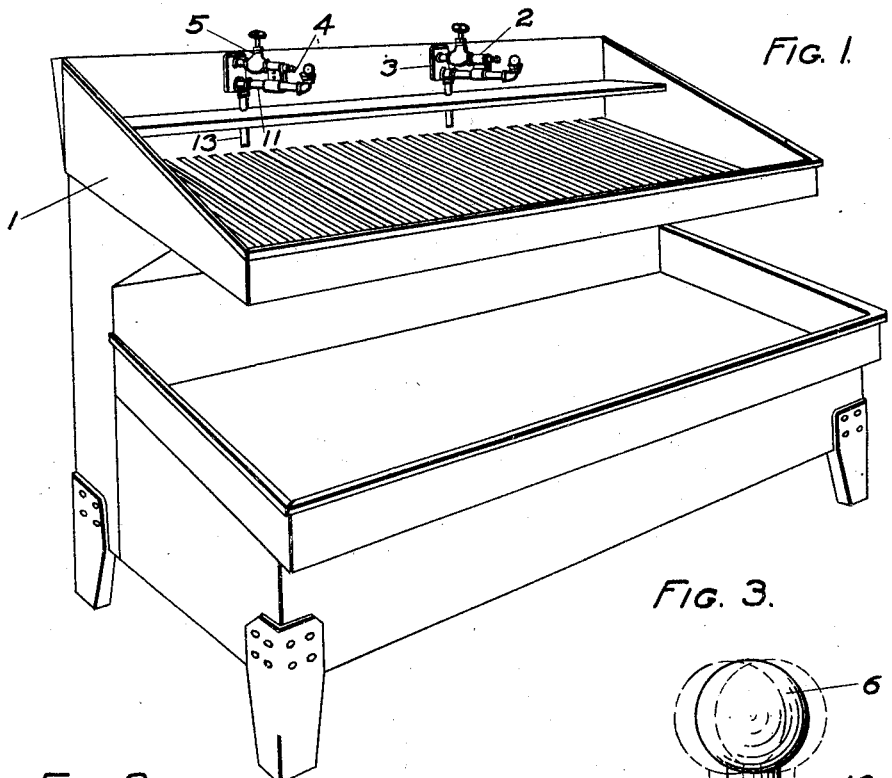
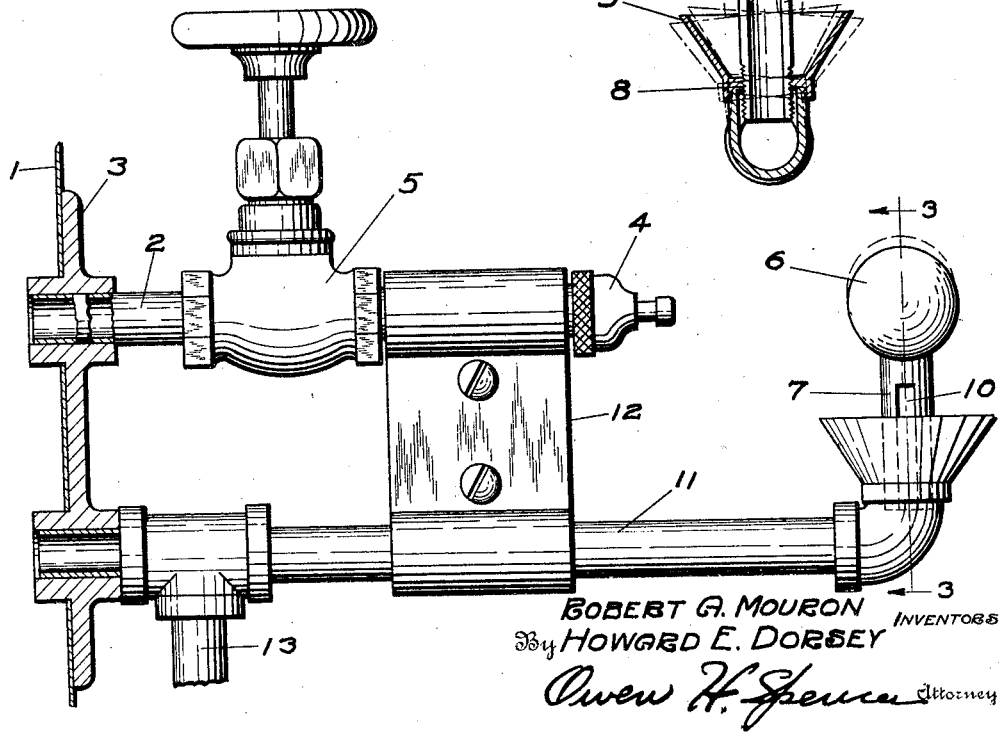
ROBERT A. MOURON
HOWARD E. DORSEY  INVENTORS
By Owen H. Spencer  Attorney Patented Nov. 3, 1931

1,830,709

UNITED STATES PATENT OFFICE

ROBERT A. MOURON AND HOWARD E. DORSEY, OF INDIANAPOLIS, INDIANA; SAID MOURON ASSIGNOR TO SAID DORSEY

VEGETABLE SPRAYING ATOMIZER

Application filed August 1, 1930. Serial No. 472,360.

This invention relates to spraying atomizers designed primarily for spraying vegetables or the like when displayed for sale and one feature of the invention is the provision of means for directing a stream of water horizontally against an object for atomizing or disintegrating the volume of water and discharging the same onto the vegetables in a more or less fine mist.

A further feature of the invention is the provision of means for directing the atomized particles to any selected location.

A further feature of the invention is the provision of means for collecting any waste particles of water and directing the same into a suitable drain.

Other objects and advantages will be hereinafter more fully set forth and pointed out in the accompanying specification.

In the accompanying drawings which are made a part of this application,

Figure 1 is a perspective view of a vegetable displaying rack with the spraying mechanism attached thereto.

Figure 2 is a side elevation of the spraying mechanism on an enlarged scale and partly in section, and, Figure 3 is a transverse sectional view as seen along line 3—3, Fig. 2, parts being shown in elevation.

Referring to the drawings, the numeral 1 designates a vegetable containing and displaying rack, which may be constructed in any approved shape and design, into which vegetables or the like are to be placed when exhibited for sale or other purposes and in order to keep the vegetables in a fresh green state, means is provided for discharging an atomized spray of water substantially in the form of mist, over the vegetables.

Such spraying means comprises a water supply pipe 2, preferably extending through a supporting plate 3, which may be attached to one wall of the rack 1 or to any other suitable object, said pipe 2 extending in a horizontal plane and terminating at its outer end in a nozzle 4, also in a horizontal plane, said pipe 2 having any suitable form of valve 5 in its length so that the amount of water discharging from the nozzle 4 may be regulated or entirely cut off.

In order to convert the water discharging from the nozzle 4 into a spray or mist, a ball like knob 6 is positioned in the path of the water discharging from the nozzle, said knob being supported by a hollow stem 7, which is in turn threaded into an opening 8 of a drain cup 9, said stem having slots 10 through which the water drains from the cup 9 into a drain pipe 11. The drain pipe 11 is preferably in a plane below and in line with the supply pipe 2, a bracket 12 connecting the drain pipe with the supply pipe and the inner end of the pipe 11 extending through the plate 3 and with the end thereof open so as to prevent a vacuum forming in the drain pipe.

By threading the stem 7 into the opening in the drain cup 9, the knob 6 may be adjusted vertically for causing the greater volume of mist to pass either above or below the knob and by connecting the drain cup to the drain pipe in a manner that it may be rotated, as shown by dotted lines in Fig. 3, a greater volume of the mist may be directed laterally of the knob in either direction if desired.

The water, as it strikes the knob 6, forms a film over the surface of the knob directly in the path of the stream of water and it is this accumulation of water which is collected by the flared drain cup 9 and carried off through the drain pipe 11 and extension 13.

By placing the supply pipe 2 in a horizontal position and placing the knob in the path thereof, the stream of water will be converted into a perfect mist on striking the knob and by adjustably mounting the knob as shown, the volume of mist may be directed uniformly over the entire contents of the rack or to any preferred section of the rack, so that should the vegetables in a particular part of the rack require more water than the others, or should a portion of the rack be empty, the knob may be adjusted to properly distribute the mist without undue wastage of the water.

What we claim is:

1. In a spraying atomizer, a horizontally disposed water supply pipe, a nozzle at the discharge end thereof, a drain pipe in a plane below said supply pipe, a flared drain cup attached to the free end of said drain pipe and laterally rotatable thereon, a hollow standard longitudinally adjustably attached to said drain cup, said standard having elongated vertically extending drain openings adjacent its lower end, and a ball like knob in the discharge path of said nozzle and thus supported by the upper end of said standard.

2. In a spraying atomizer, a horizontally disposed water supply pipe, a nozzle at the outer end of said pipe, a supply controlling valve in the length of said supply pipe, a drain pipe, a bracket connecting said drain pipe to said supply pipe, a flared drain cup swivelly attached to said drain pipe whereby the drain cup may be moved in a lateral direction with respect to the discharge end of said nozzle, a hollow standard adjustably attached to said drain cup having drain openings, and an atomizing ball like knob in the discharge path of said nozzle and held in position by said standard.

3. In a spraying atomizer, a horizontally disposed liquid supply nozzle, a drain pipe in a plane below said nozzle, a flared drain cup attached to the free end of said drain pipe and laterally rotatable thereon, a standard having a vacant space in the lower portion thereof, said vacant space having openings which communicate with said drain pipe and said flared cup, said standard being attached longitudinally adjustable to said drain cup, and a ball like knob attached to the upper end of said standard, in the path of said nozzle.

4. In a spraying atomizer, a horizontally disposed liquid supply nozzle, a supply controlling valve communicating with said nozzle, a drain pipe, a supporting means connecting said drain pipe to said nozzle, a flared drain cup swivelly attached to said drain pipe, whereby the drain cup may be moved in a lateral direction with respect to the discharge end of said nozzle, a standard adjustably attached to said drain cup having drain openings communicating with said drain pipe, and an atomizing ball like knob supported by the upper end of said standard, in the path of said nozzle.

In testimony whereof, we have hereunto set our hands on this the 26th day of July, 1930.

ROBERT A. MOURON.
HOWARD E. DORSEY.